United States Patent [19]

Karlsson

[11] Patent Number: 5,774,785
[45] Date of Patent: Jun. 30, 1998

[54] ADAPTIVE QUALITY ADJUSTMENT

[75] Inventor: Patrik Karlsson, Älta, Sweden

[73] Assignee: Telefonaktiebolaget LM Ericsson, Stockholm, Sweden

[21] Appl. No.: 667,876

[22] Filed: Jun. 20, 1996

[51] Int. Cl.$^6$ ...................................................... H04B 1/00
[52] U.S. Cl. .............................................. 455/522; 455/69
[58] Field of Search .............................. 455/522, 69, 88, 455/127, 38.3

[56]  References Cited

U.S. PATENT DOCUMENTS

| 4,777,653 | 10/1988 | Bonnerot et al. | 455/522 X |
| 5,241,690 | 8/1993 | Larsson et al. | 455/522 |
| 5,333,175 | 7/1994 | Ariyavisitakul et al. | 455/522 X |
| 5,386,589 | 1/1995 | Kanai | 455/522 X |
| 5,465,399 | 11/1995 | Oberholtzer et al. | 455/522 X |
| 5,530,917 | 6/1996 | Andersson et al. | 455/436 |
| 5,551,057 | 8/1996 | Mitra | 455/522 |
| 5,579,373 | 11/1996 | Jang | 455/522 X |
| 5,590,409 | 12/1996 | Sawahashi et al. | 455/522 X |

FOREIGN PATENT DOCUMENTS 0 687 075   12/1995   European Pat. Off. .

OTHER PUBLICATIONS

R.D. Yates et al., "Integrated Power Control and Base Station Assignment", IEEE Transactions on Vehicular Technology, vol. 44, No. 3, Aug. 1995, pp. 638–644.

J. Zander, "Performance of Optimum Transmitter Power Control In Cellular Radio Systems", IEEE Transactions on Vehicular Technology, vol. 41, No. 1, Feb. 1992, pp. 57–62.

S.C. Chen et al., "Admission Control Schemes For Wireless Communication Networks With Adjustable Transmitter Powers", Proceedings of the Conference on Computer Communications, Toronto, Jun. 12–16, 1994, vol. 1, pp. 21–28.

M. Almgren et al., "Capacity Enhancements in a TDMA System", IEEE 1993, pp. 277–280.

M. Almgren et al., "Power Control In A Cellular System", 44th IEEE Transactions Vehicular Conference, Jun. 1993, pp. 833–837.

Primary Examiner—Thomas J. Mullen, Jr.
Attorney, Agent, or Firm—Burns, Doane, Swecker & Mathis, L.L.P.

[57]  ABSTRACT

Signal quality in a region of a telecommunication system is improved by first determining a filtered transmitter power level that represents transmitter power levels in the region. Then the filtered transmitter power level is used to determine a new adaptive signal quality reference level. Finally, the new adaptive signal quality reference level is used to adjust the individual transmitter units in the region so that the actual signal quality experienced by the communication links in the region substantially equals the new adaptive signal quality reference level.

26 Claims, 9 Drawing Sheets

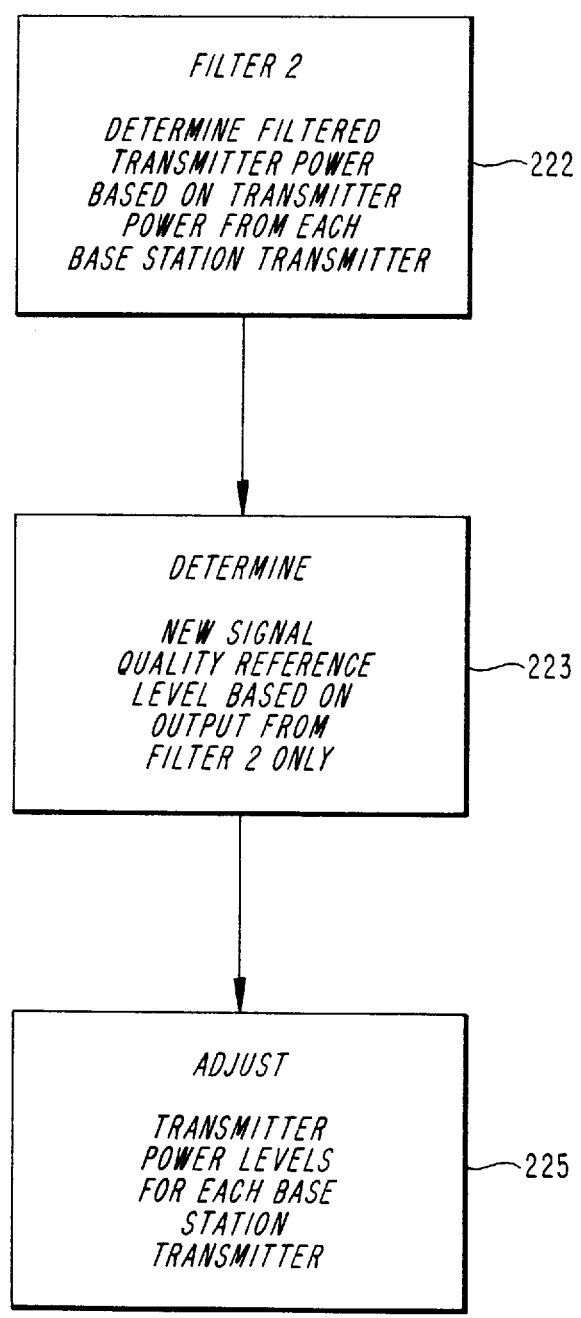

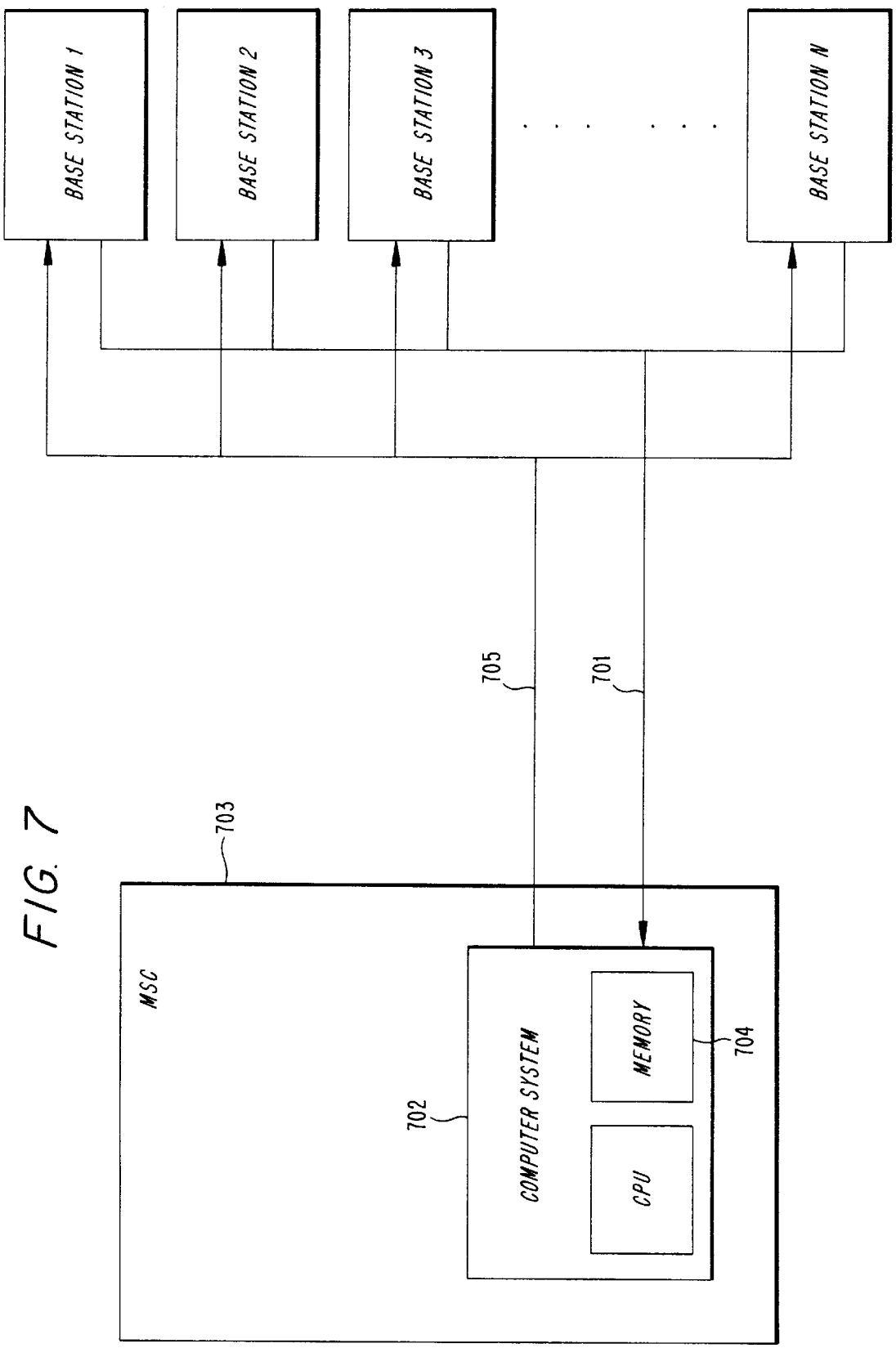

ADAPTIVE QUALITY ADJUSTMENT

BACKGROUND

The present invention relates to cellular telecommunication systems, and more particularly to a method for automatically adjusting the signal quality reference level to achieve better average signal quality throughout the telecommunication system.

In a cellular telecommunication system (e.g., a cellular telephone system), there are a plurality of cells as illustrated by cells C1–C10 in FIG. 1. Typically, each of the cells C1–C10 has a single base station, for example, base stations B1–B10. In general, each base station B1–B10 transmits and receives communication signals to and from mobile units within the corresponding cell.

The communication signals between each mobile unit and a selected one of the base stations are carried over specific frequency channels. Some cellular telecommunication systems, or groups of cells within a cellular telecommunication system, employ a fixed frequency plan. This means that each of the cells C1–C10 will be assigned an unchanging set of frequencies for use in the cell. Other cellular telecommunication systems, or groups of cells within a cellular telecommunication system, employ an adaptive or dynamic frequency plan. In the latter case, a particular frequency or set of frequencies used in a cell may change over time.

In both fixed and adaptive frequency allocation plans, a particular frequency or set of frequencies may be assigned to more than one cell in the telecommunication system. When frequencies are assigned to more than one cell, there is always a risk that a first communication signal carried over a frequency in a first cell will interfere with a second communication signal carried over the same frequency in a second cell. Interference between two different communication signals being transmitted over the same frequency channel in two different cells, is often referred to as co-channel interference. There is also a risk that a first communication signal carried over a first frequency will interfere with a second communication signal carried over a second frequency, where the first and second frequencies are adjacent to each other. This type of interference is often referred to as cross-channel interference. The amount of cross-channel interference is typically a function of frequency separation, system hardware, and the signal strength of the communication signals in the system.

Since the signal quality for any given communication signal is inversely proportional to interference and directly proportional to transmitter power (i.e., signal strength), most telecommunication systems regulate the signal quality for each frequency channel by defining a fixed signal quality reference level. Then, the transmitter power for each frequency channel is periodically adjusted in an attempt to achieve an actual signal quality, for each frequency channel, that equals or substantially equals the fixed signal quality reference level.

For example, if the actual signal quality of a particular communication signal is much greater than the fixed signal quality reference level, the system will attempt to lower the corresponding transmitter power. By lowering transmitter power, actual signal quality should approach the fixed signal quality reference level and any co-channel or cross-channel interference caused by the communication signal should be reduced. If, on the other hand, the actual signal quality of a particular communication signal is much less than the fixed signal quality reference level, the system will attempt to increase transmitter power in an attempt to achieve the fixed signal quality reference level.

Unfortunately, periodically adjusting transmitter power to regulate signal quality with respect to a fixed signal quality reference level does not result in optimal, average signal quality throughout the cellular telecommunication system. This is primarily due to the fact that transmitter hardware in both the mobile units and base stations restricts transmitter power to a range defined by a maximum transmitter power and a minimum transmitter power. Therefore, transmitter power can only be adjusted so high and so low.

Consequently, if the interference level for a given frequency channel is much lower than expected (i.e., lower than an assumed interference level), the actual signal quality associated with that frequency channel will be greater than the fixed signal quality reference level. As a result, the system will decrease transmitter power in an attempt to force the actual signal quality of the frequency channel towards the fixed signal quality reference level. In fact, the system should increase transmitter power levels to achieve even better actual signal quality level since interference is very low.

Similarly, if average interference for a given frequency channel is much greater than expected, the actual signal quality associated with that frequency channel will be less than the fixed signal quality reference level, but due to the transmitter hardware limitations described above, the system, in all likelihood, will be unable to increase power enough to achieve the fixed signal quality reference level. Moreover, this latter case is likely to result in an unstable system. For example, if one or more mobile units in a first cell raise their transmitter power levels to overcome co-channel interference due to one or more mobile units operating on the same frequency channels in a second cell, the mobile units in the second cell are likely to respond by increasing their transmitter power levels. The mobile units in both the first and second cells will continue to increase transmitter power levels to overcome the ever increasing co-channel interference levels until the transmitter hardware restricts the mobile units from increasing transmitter power any further. The end result is increased power consumption, increased interference levels, and little to no improvement in signal quality. However, the real problem involves communication links associated with mobile units which are operating in an extremely poor environment (e.g., behind large obstructions such as buildings). Because these mobile units are already operating at maximum transmitter power, no further adjustments can be made to compensate for additional co-channel or cross-channel interference caused by other transmitters, thereby resulting in a severe degradation of signal quality for these communication links.

It is therefore desired to provide a technique for regulating transmission power levels in a way that maximizes the average signal quality throughout the cellular telecommunication system.

SUMMARY

It is an object of the present invention to improve average signal quality throughout a cellular telecommunication system.

It is yet another object of the present invention to substantially improve the signal quality of certain communication links in a cellular telecommunication system which are operating in an environment with an excessively high interference level.

It is another object of the present invention to improve average signal quality throughout a cellular telecommunication system by employing an adaptive signal quality reference level.

It is still another object of the present invention to continuously or periodically determine a new adaptive signal quality reference level based on a filtered transmitter power and a preestablished relationship between filtered transmitter power and signal quality reference level.

In accordance with one aspect of the present invention, the foregoing and other objects are achieved by a method and apparatus for controlling transmitter power comprising the steps of determining a reference transmitter power level that is representative of an amount of power being transmitted in a region of the telecommunication system; determining an adaptive signal quality reference level as a function of the reference transmitter power level; and adjusting transmitter power in the region of the telecommunication system so as to cause actual signal quality within the region of the telecommunication system to substantially equal the adaptive signal quality reference level.

In accordance with another aspect of the present invention, a method and apparatus for controlling transmitter power comprises the steps of determining at least two reference transmitter power levels, each representing an amount of power being transmitted in a region of the telecommunication system; determining an adaptive signal quality reference level based on at least one of said at least two reference transmitter power levels; and adjusting transmitter power in the region of the telecommunication system so as to cause actual signal quality within the region of the telecommunication system to substantially equal the adaptive signal quality reference level.

In accordance with still another aspect of the present invention, a method and apparatus for controlling transmitter power levels comprises the steps of determining a first reference transmitter power level that is representative of a first amount of transmitter power being utilized by each transmitter from a first group of transmitters in a region of the telecommunication system; determining a second reference transmitter power level that is representative of a second amount of transmitter power being utilized by each transmitter from a second group of transmitters in the region of the telecommunication system; determining a first adaptive signal quality reference level as a function of said first reference transmitter power level; determining a second adaptive signal quality reference level as a function of said second reference transmitter power level; adjusting the amount of transmitter power being utilized by each transmitter from said first group of transmitters so as to cause actual signal quality associated with each transmitter from said first group of transmitters to substantially equal said first adaptive signal quality reference level; and adjusting the amount of transmitter power being utilized by each transmitter from said second group of transmitters so as to cause actual signal quality associated with each transmitter from said second group of transmitters to substantially equal said second adaptive signal quality reference level.

In accordance with another aspect of the present invention, a method and apparatus for controlling transmitter power level comprises the steps of determining a reference transmitter power level that is representative of an amount of transmitter power associated with a frequency channel in a telecommunication system; determining an adaptive signal quality reference level for said frequency channel as a function of said reference transmitter power level; and adjusting the amount of transmitter power associated with said frequency channel as a function of said adaptive signal quality reference level.

BRIEF DESCRIPTION OF THE DRAWINGS

The objects and advantages of the invention will be understood by reading the following detailed description in conjunction with the drawings in which:

FIGS. 2A, 2B, 2C, and 2D are flow charts depicting steps for adjusting transmission power in accordance with several exemplary embodiments of the present invention;

FIG. 7 is a block diagram of an exemplary system hardware configuration for implementing the present invention.

DETAILED DESCRIPTION

Figure 1:
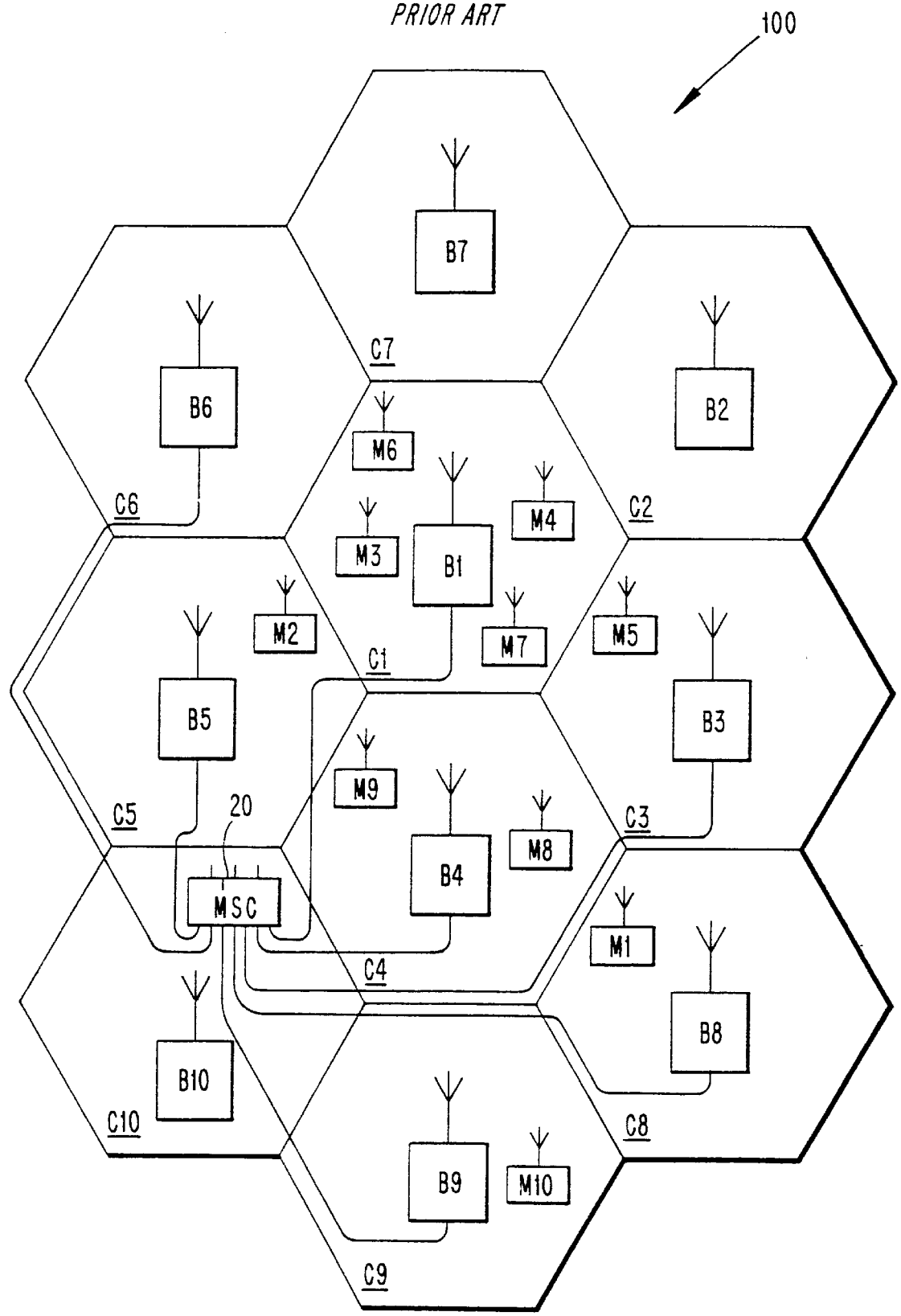
FIG. 1 illustrates a general lay-out of a cellular telecommunication system.

The various features of the invention will now be described with respect to the figures, in which like parts are identified with the same reference characters.

Unlike the fixed signal quality reference level methods currently employed in cellular telecommunication systems, the present invention employs an adaptive signal quality reference level method. The ultimate goal of this adaptive signal quality reference method is to achieve the best average, system-wide signal quality level, rather than the best signal quality level for a few particular communication signals at the expense of other communication signals.

Figure 2A:
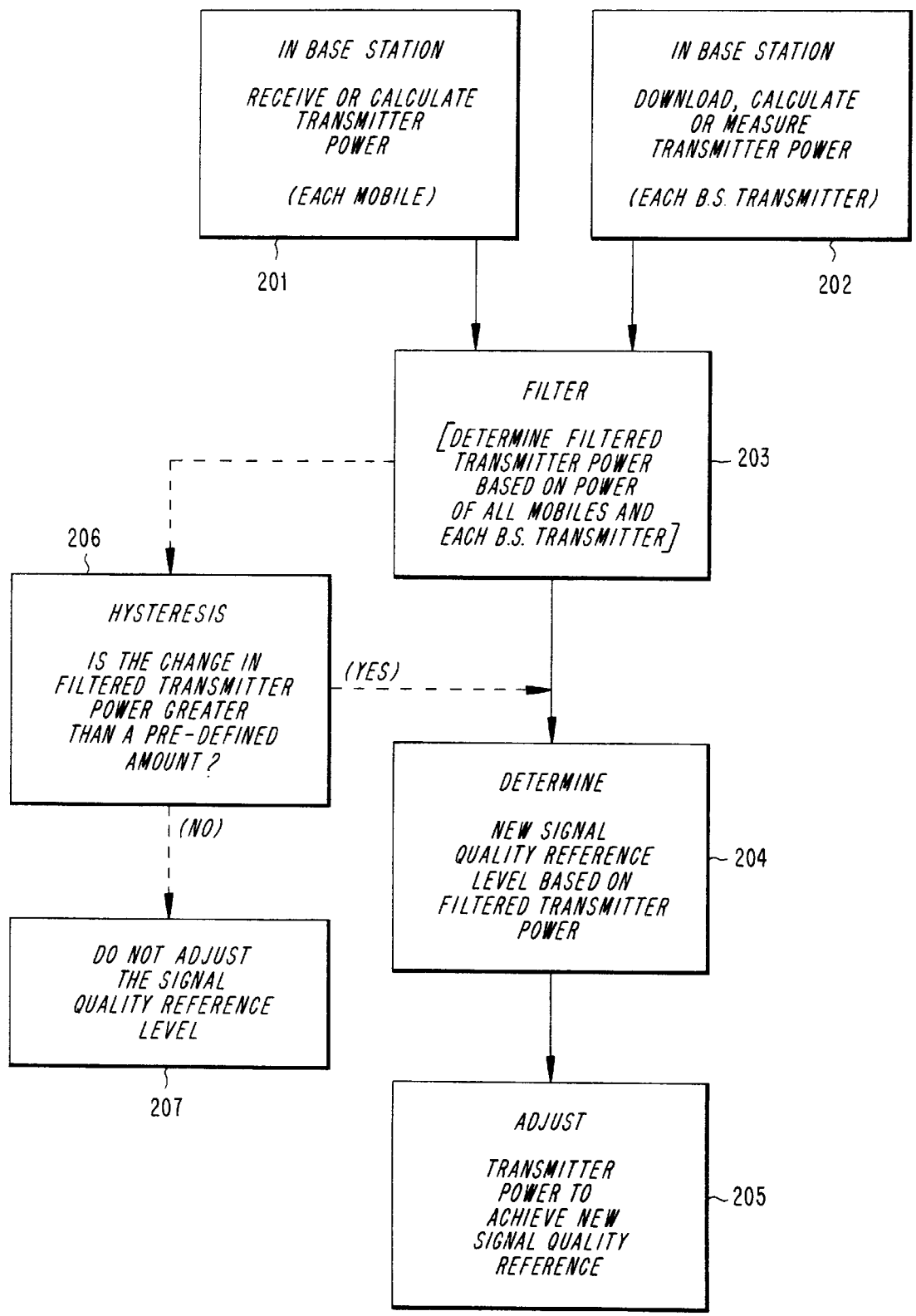

FIG. 2A is a flow chart depicting steps for continuously or periodically adjusting transmitter power in accordance with a first exemplary embodiment of the present invention. First, some number of mobile units operating in a given region (e.g., a cell, a group of cells, or all of the cells) of the telecommunication system, continuously or periodically send their transmitter power levels to their respectively assigned base stations, where the number of mobile units performing this step may range from just one mobile unit up to all of the mobile units in the given region. Transmitter power level may refer to a discrete power level, for example, 1 ... N, where each discrete level corresponds to a value in decibels (dB). This first step of sending transmitter power levels from each mobile unit to the base station is illustrated by block 201.

In addition to receiving the transmitter power levels from each mobile unit, the base station can store the transmitter power levels being utilized by the base station transmitters. This step is illustrated by block 202. The steps represented by blocks 201 and 202 may be performed simultaneously.

Next, the transmitter power levels from the mobile units and the transmitter power levels from the base station transmitters are filtered, as illustrated by block 203, to produce a filtered transmitter power level that is representative of the overall transmitter power level being utilized within the region during a given period of time. Any number of well known filtering techniques may be used for the filter illustrated in block 203. For example, the filter may combine the transmitter power levels by computing an average transmitter power level.

In accordance with one aspect of the invention, the signal quality reference level is not constant, but is instead a function of the filtered transmitter power level. Thus, once a filtered transmitter power level is established for the given region, as shown in block 203, the filtered transmitter power level is used to determine a new (i.e., updated) adaptive signal quality reference level based on a predefined relationship between filtered transmitter power level and signal quality reference level, as will be discussed in greater detail below. This determination is illustrated in block 204. Finally, the transmitters in that region are adjusted, as shown in block 205, so as to make the actual signal quality in the region substantially equal to the new signal quality reference level.

In a second exemplary embodiment, similar to the first exemplary embodiment described above, the base station may calculate the transmitter power value (in dB) for each mobile unit (see block 201) rather than having each mobile unit send its transmitter power level as described above in the first exemplary embodiment. Specifically, the transmitter power for each mobile unit ($TP_m$) can be calculated at the base station using the following equation:

$$TP_m = (TP_b + SS_m - SS_b) \quad (1)$$

where the transmitter power for each corresponding base station transmitter ($TP_b$) is a value that is set by the system operator or it is a value that is measured at the base station. The signal strength of each mobile unit ($SS_m$) can also be directly measured at the base station and the signal strength of the base station ($SS_b$) can be measured by each mobile unit, and transmitted back to the base station. The reason for calculating transmitter power for each mobile unit in lieu of using the transmitter power levels sent by each mobile unit, as described in the first exemplary embodiment, is that calculated transmitter power tends to be more accurate than nominal transmitter power level.

Similarly, the base station can directly measure or calculate the transmitter power ($TP_b$) associated with the base station transmitters in a like manner (see block 202) using the following equation:

$$TP_b = (TP_m + SS_b - SS_m). \quad (2)$$

where the value for $TP_m$ is transmitted to the base station from the corresponding mobile unit.

Figure 2B:
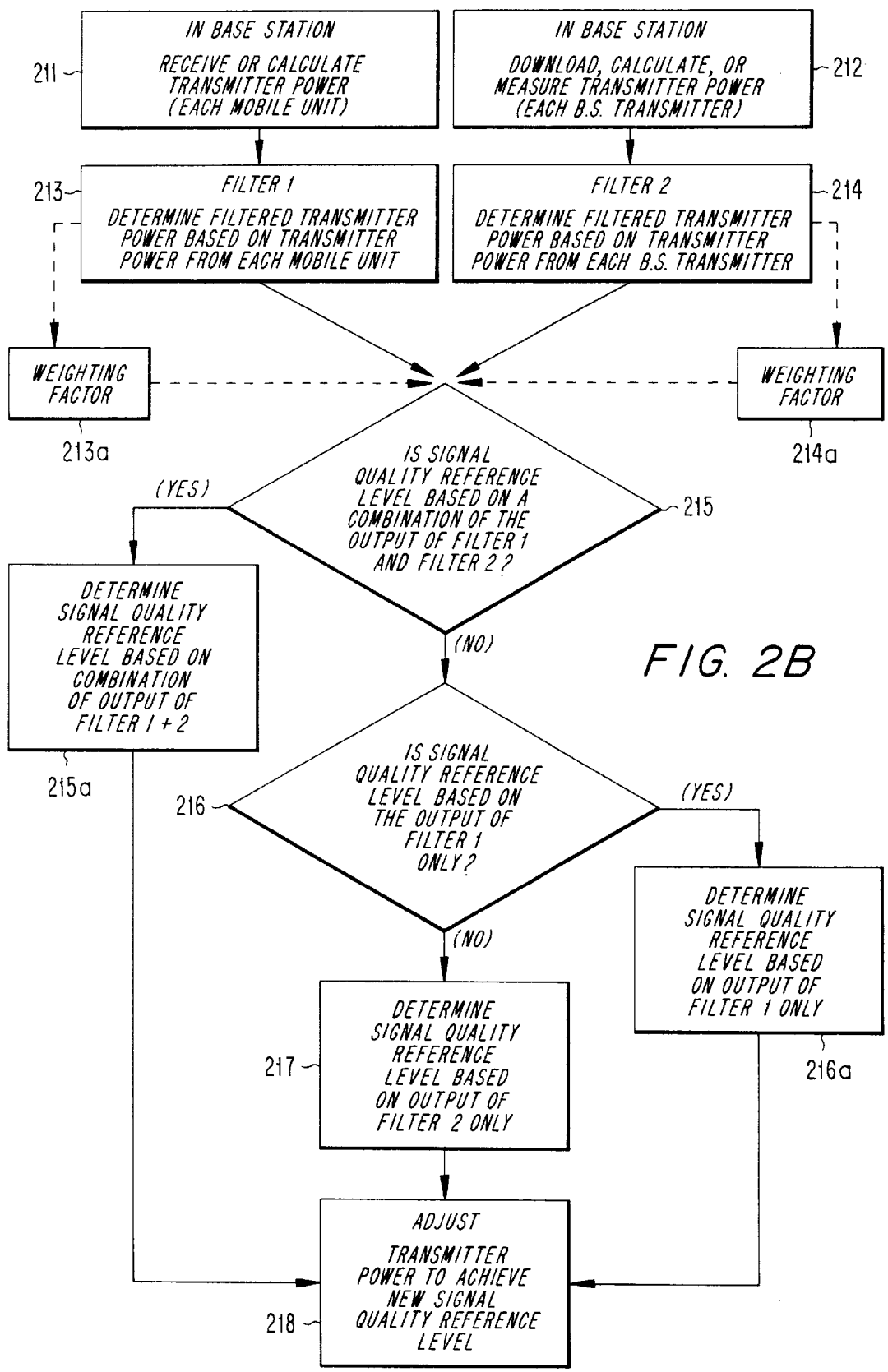

In yet a third exemplary embodiment, also similar to the first embodiment described above, two filters may be employed as illustrated in FIG. 2B. A first filter as illustrated in block 213, is employed to determine a filtered transmitter power level based on the transmitter power levels from, for example, each of the mobile units (see block 211). A second filter, as illustrated in block 214, is employed to determine a filtered transmitter power level based on the transmitter power levels from each base station transmitter (see block 212). Then, a combination of filtered transmitter power level based on the mobile units and filtered transmitter power level based on the base station transmitters can be used to determine the new signal quality reference level, as illustrated by block 215 and 215a. The step of combining the filtered transmitter power level of filter 1 and filter 2 may involve "weighting" the levels, as illustrated by blocks 213a and 214a, so that each separately influences the determination of the new adaptive signal quality reference level by a different degree. There may be occasions when the output of filter 1 or filter 2 should not be relied upon. Therefore, as an alternative, either the filtered transmitter power level based on the mobile units or the filtered transmitter power level based on the base station transmitters may be used alone to determine the new signal quality reference level as illustrated by blocks 216, 216a, and 217. Once the new signal quality reference level is determined as a function of filter 1, filter 2, or a combination of both filter 1 and filter 2, transmitter power levels in the region are adjusted so that the actual signal quality in the region substantially equals the new signal quality reference level, as illustrated in block 218. One skilled in the art will understand that this alternative approach is the same as applying a "weighting" factor of zero to the filtered output of either filter 1 or filter 2.

Figure 2C:
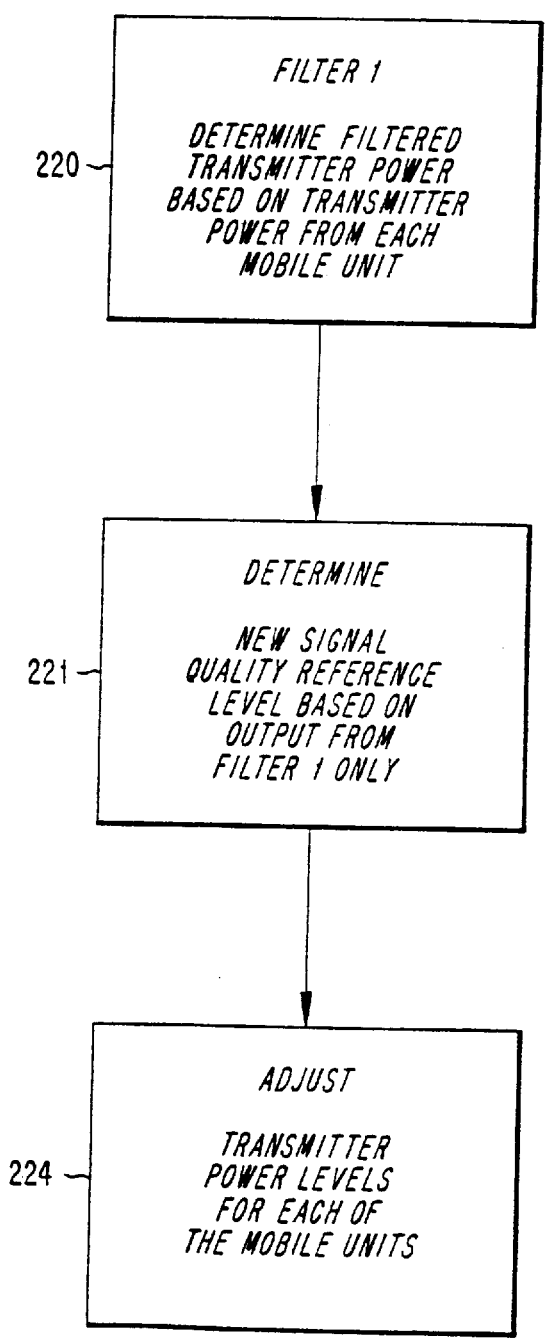

FIGS. 2C and 2D depict another alternative embodiment, in which the output of the first filter 220 (i.e., the filtered transmitter power based on the transmitter power levels from each of the mobile units in the region) is used to determine a new adaptive signal quality reference level for the mobile units, as illustrated in block 221. Simultaneously and independently, the output of the second filter 222 (i.e., the filtered transmitter power based on the transmitter power levels from the base station transmitters) is used to determine a new adaptive signal quality reference level for the base station transmitters, as illustrated in block 223. Then, the two signal quality reference levels are used to independently adjust the transmitter power levels for the mobile units and the base station transmitters, as illustrated by blocks 224 and 225 respectively.

In accordance with the methods described above and as illustrated in FIGS. 2A through 2D, the signal quality reference level is always a function of filtered transmitter power level. The function representing the relationship between signal quality reference level and filtered transmitter power level may, in turn, be represented by curve 301 in FIG. 3. It is important to note, the methods described above do not generate curve 301. Instead, curve 301 is predefined (based on past signal quality performance as a function of filtered transmitter power in the given region of the cellular telecommunication system) and utilized by the aforementioned methods to determine a new signal quality reference level given a new filtered transmitter power level. Furthermore, one skilled in the art will readily understand that the values associated with curve 301, for example, could be programmed into a computer-based system or apparatus which may, in turn, be used to implement any of the previously described methods as will be described in greater detail below.

Figure 3:
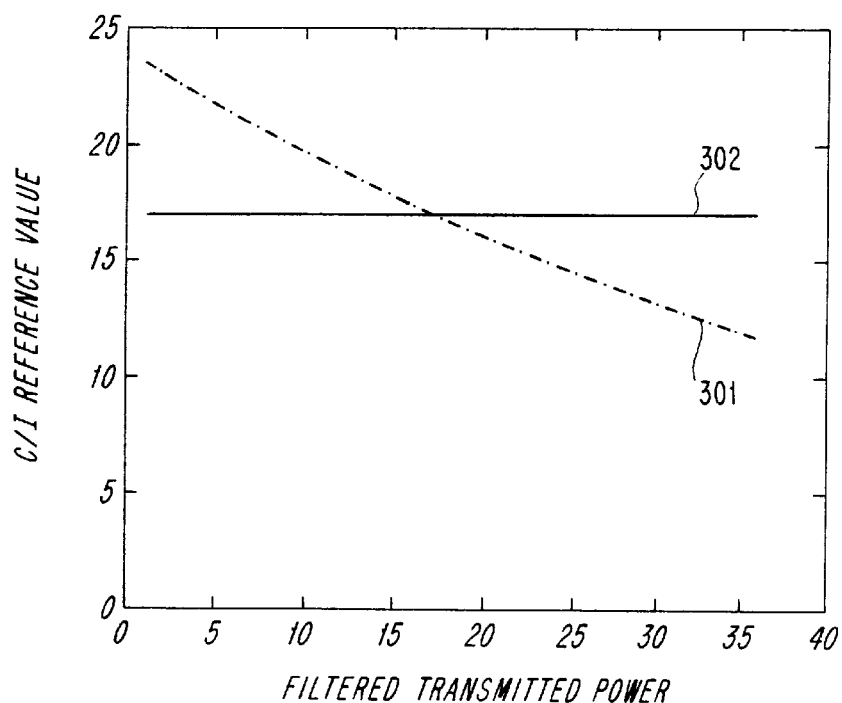
FIG. 3 depicts one exemplary relationship between filtered transmitter power and adaptive signal quality reference values.

The graph in FIG. 3 will now be described in greater detail. In FIG. 3, the vertical axis of the graph represents a range of signal quality reference levels. In an exemplary embodiment of the present invention, the signal quality reference level may be defined in terms of C/I, where C represents the received signal strength of a carrier signal (i.e., power level) and I represents noise or interference. However, one skilled in the art will understand that other definitions of signal quality may be used in lieu of C/I, for example, bit error rate (BER) or the number of dropped calls (NDC). The horizontal axis represents filtered transmitter power level. Given a specific filtered transmitter power level, the aforementioned methods may determine a new adaptive signal quality reference level, for example, in accordance with curve 301, which represents a relationship between signal quality reference level and filtered transmitter power level as discussed above. For purposes of comparison with the inventive techniques disclosed here, curve 302 illustrates the relationship between filtered transmitter power and a fixed signal quality reference level in accordance with prior methods. Moreover, curve 302 shows that in prior methods, the fixed signal quality reference level is independent of filtered transmitter power levels (i.e., curve 302 is actually a flat line with zero slope).

Curve 301, as illustrate in FIG. 3, has a negative slope, i.e., indicating an inverse relationship between filtered transmitter power level and signal quality reference level. Therefore, a large filtered transmitter power level will indicate a need to utilize a relatively lower signal quality reference level. Conversely, a small filtered transmitter power level will indicate a need to utilize a relatively higher signal quality reference level. For example, when filtered transmitter power becomes significantly high, a relatively higher signal quality can be achieved by establishing a lower adaptive signal quality reference level. Lowering the adaptive signal quality reference level will cause the transmitters operating in the region to begin transmitting at lower power levels. Consequently, cross-channel and co-channel interference will significantly decrease and actual signal quality in the region will increase, especially for those mobile units that are operating in a very high transmission power environment as described above.

Similarly, when filtered transmitter power becomes significantly low, a relatively higher signal quality level may be achieved without causing all of the transmitters to operate at or near maximum power. By establishing a new relatively high signal quality reference level when filtered transmitter power becomes low, the transmitters associated with the one or more communication links in the region will begin boosting power levels, thus allowing these communication links to realize even better signal quality.

Alternatively, the method described above for determining the value of the new adaptive signal quality reference level may employ a hysteresis. Accordingly, a new adaptive signal quality reference level will be determined only if filtered transmitter power has significantly changed (i.e., by a predefined amount) as illustrated by blocks 206 and 207 in FIG. 2A. The purpose of this alternative is to avoid wasting time changing the signal quality reference level when the effect of these steps on actual signal quality will be small and insignificant. One skilled in the art will understand that a hysteresis could also be effectively utilized with any of the exemplary embodiments described herein below.

Figure 4:
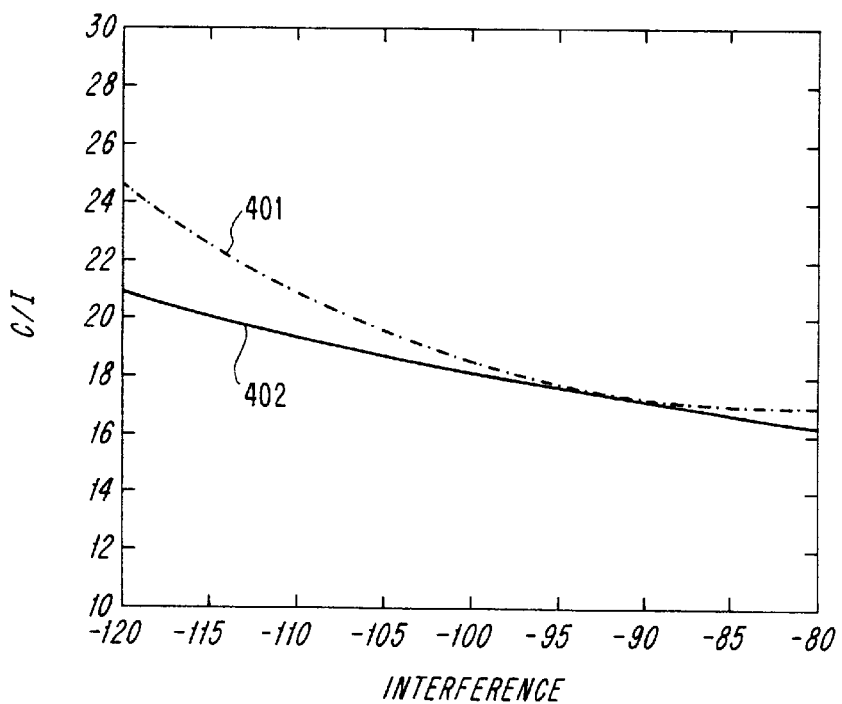
FIG. 4 is a graph that compares average signal quality for a system that employs the inventive, adaptive signal quality reference scheme versus a system that employs a fixed signal quality reference scheme.

FIG. 4 illustrates a performance comparison between a system that employs a fixed signal quality reference level (see line 302 in FIG. 3) method and the present invention which employs an adaptive signal quality reference level method. In FIG. 4, the vertical axis represents overall (i.e., average) signal quality in a given region, while the horizontal axis represents interference level. Curve 401 indicates that better average signal quality is achieved by adjusting transmitter power levels to satisfy an adaptive signal quality reference level than by basing transmitter power level adjustment on a fixed signal quality reference level (curve 402). The difference in average signal quality level when using an adaptive method as compared to a fixed method is most noticeable when interference is either much greater than expected or much less than expected.

Figure 5:
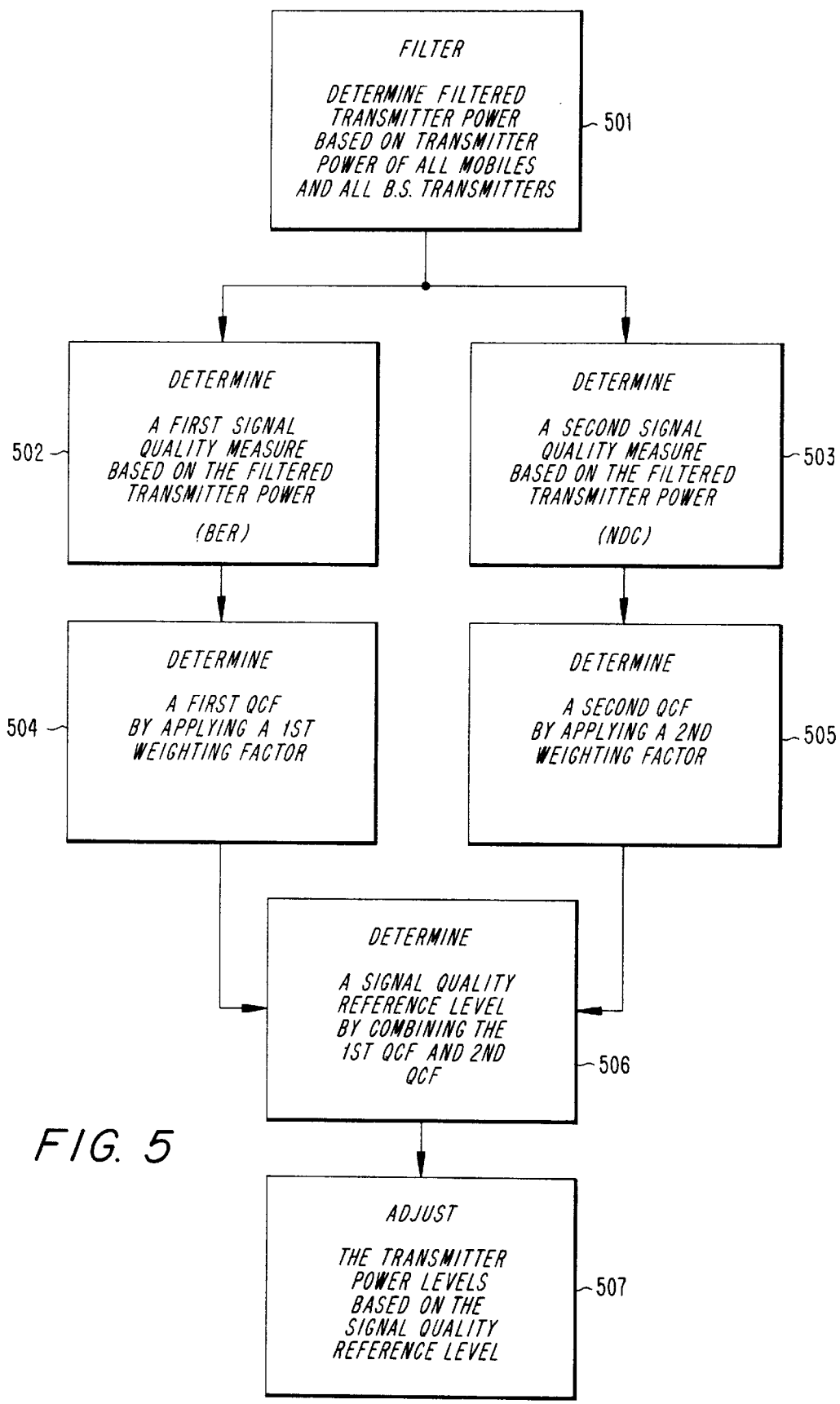
FIG. 5 is a flow chart depicting steps for another exemplary embodiment of the present invention where two or more signal quality measures are utilized for determining the new adaptive signal quality reference level.
Figure 6:
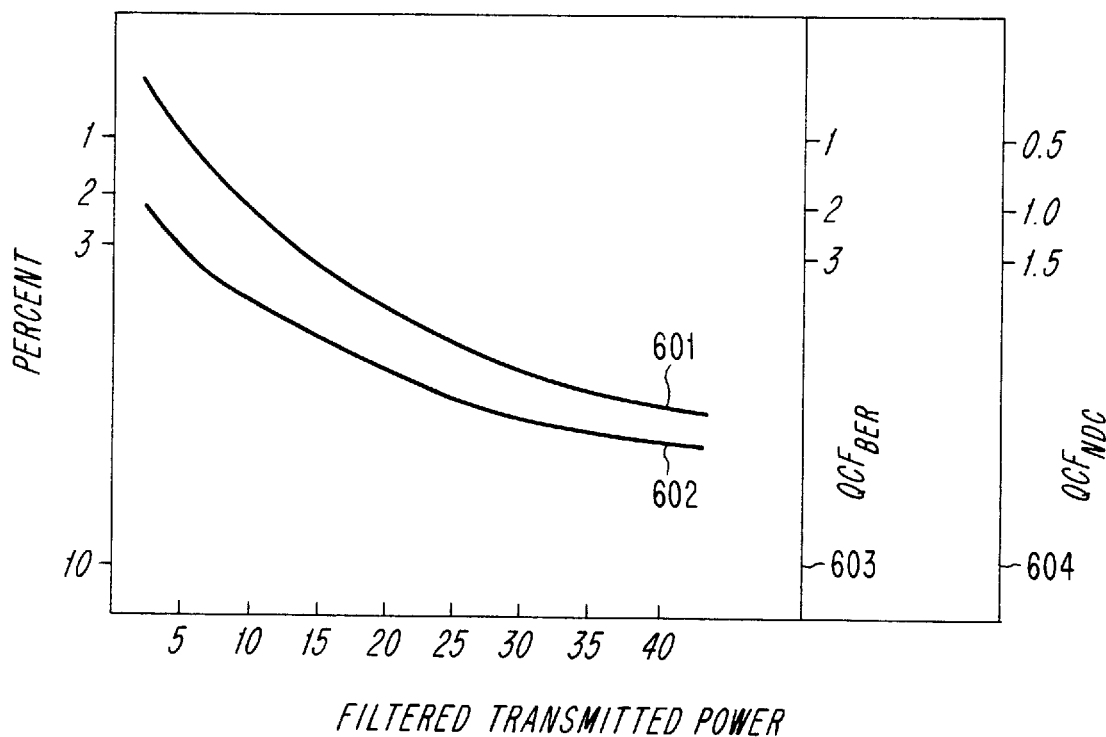
FIG. 6 depicts an exemplary relationship between filtered transmitter power and two separate signal quality measurements.

In the exemplary embodiments described above, the new adaptive signal quality reference level was defined in terms of a single signal quality measure such as C/I, BER, or NDC. FIG. 5 illustrates yet another exemplary embodiment of the present invention, wherein the new adaptive signal quality reference level is defined by a combination of two or more signal quality measures, for example, BER and NDC. In contrast with the first exemplary embodiment, in which only one curve defines the relationship between the signal quality reference level and filtered transmitter power, this exemplary embodiment requires, for example, two curves, which are illustrated in FIG. 6. In FIG. 6, curve 601 may represent the relationship between filtered transmitter power and normalized BER, while curve 602 may represent the relationship between filtered transmitter power and normalized NDC. Then, both BER and NDC in combination will be used to determine the new signal quality reference level as described in greater detail hereinbelow.

First, filtered transmitter power level is determined as a function of the actual transmitter power levels being utilized by the mobile unit transmitters and the base station transmitters in a given region of the telecommunication system. This step is illustrated by block 501.

Second, the filtered transmitter power level is used to determine a first signal quality measure, such as BER, as shown in block 502. This is accomplished by taking the filtered transmitter power level and determining the corresponding BER value according to a predefined relationship between BER and filtered transmitter power as illustrated by curve 601 in FIG. 6. Simultaneously, the filtered transmitter power level is used to determine a second signal quality measure, such as NDC, as shown in block 503. This is accomplished by taking the filtered transmitter power level and determining the corresponding NDC value according to a predefined relationship between NDC and filtered transmitter power as illustrated by curve 602 in FIG. 6.

After the corresponding values for BER and NDC are determined, as described above, a first quality control factor (QCF) is determined for BER ($QCF_{BER}$) and a second QCF is determined for NDC ($QCF_{NDC}$). $QCF_{BER}$ represents a normalized and weighted signal quality measure that is a function of BER while $QCF_{NDC}$ represents a normalized and weighted signal quality measure that is a function of NDC. The steps of determining a normalized and weighted signal quality measure for BER and NDC are illustrated by blocks 504 and 505 respectively. The purpose for determining a weighted signal quality measure for both BER and NDC is that each signal quality measure can then individually influence the determination of the new signal quality reference level, as described in more detail below.

The two weighted signal quality measures, $QCF_{BER}$ and $QCF_{NDC}$, are then combined to determine the new adaptive signal quality reference level as illustrated by block 506. The new adaptive signal quality reference level is then used as a basis for adjusting the transmitter power levels of the mobile units and base station transmitters in the given region, as illustrated by block 507.

One skilled in the art will understand that signal quality measures other than BER and NDC may be used in combination to determine the new signal quality reference level. Furthermore, one skilled in the art will also understand that the signal quality measures used to determine the new adaptive signal quality reference level can be combined in any number of different ways. For example, the signal quality reference level may be defined as the sum of a first signal quality measure and a second signal quality measure (i.e., $QCF_{BER}+QCF_{NDC}$), or it may be defined as the difference (i.e., $QCF_{BER}-QCF_{NDC}$), or it may be defined as the product (i.e., $QCF_{BER}*QCF_{NDC}$). Finally, one of ordinary skill will understand that the weighting factors used above for BER and NDC were strictly illustrative, and that any weighting factor method can be utilized, including a scheme in which both (or all) signal quality measures being used to define the signal quality reference level are weighted evenly.

To better illustrate the steps described above, the graph in FIG. 6 shows that for a given filtered transmitter power level, curve 301 and curve 302 can be used to determine a specific BER percentage value and a specific NDC percentage value respectively, in accordance with the left vertical axis. If it is then desirable for BER to have twice as much influence over the determination of signal quality reference level as NDC, for example, weighting the BER values may be accomplished as follows (refer to the right vertical axis 603 on the graph in FIG. 6): a 1 percent BER may correspond to a QCF of 1, a 2 percent BER may correspond to a QCF of 2, and a 3 percent BER may correspond to a QCF of 3. Since NDC, in the present example, has half the weight of BER, the NDC percentages would be weighted as follows (refer to the right vertical axis 604 on the graph in FIG. 6): a 1 percent number of dropped calls will correspond to a QCF of 0.5, a 2 percent number of dropped calls will correspond to a QCF of 1.0, and 3 percent number of dropped calls will correspond to a QCF of 1.5. Then, as described above, the new adaptive signal quality reference level can be determined by combining the normalized and weighted values $QCF_{BER}$ and $QCF_{NDC}$. This new adaptive signal quality reference level, expressed in terms of a QCF, can then be used to adjust the transmitter power levels of the mobile units and base station transmitters.

Of course, in order to properly use the new adaptive signal quality reference level as a basis for adjusting the transmitter power levels of the mobile units and base station transmitters, the actual signal quality level for the region must first be determined. This may be accomplished by measuring the actual BER and NDC values for the region, normalizing and weighting each measure as described above to obtain the actual $QCF_{BER}$ and the actual $QCF_{NDC}$, and then combining the two weighted measures to determine the actual signal quality level for the region. By comparing the actual signal quality level to the new adaptive signal quality reference level, transmitter power levels of the mobile units and base station transmitters can be adjusted, i.e., increased or decreased, by an appropriate amount.

FIG. 7 depicts an exemplary configuration of telecommunication system components which might be used to execute the aforementioned methods. In the cellular telecommunication system of FIG. 7, there are N number of cells (not shown), each containing a base station 1 . . . N respectively. For the purpose of illustration, the implementation of the aforementioned methods will be described with respect to the first cell.

In the first cell, there will be numerous mobile units (not shown) transmitting and receiving communication signals to and from the first base station. The transmitters associated with the first base station and each of the mobile units in the first cell will be transmitting at specific power levels which have been adjusted so as to achieve a current signal quality reference level. In accordance with one of the exemplary embodiments of the present invention, the base station will continuously acquire (i.e., receive, measure, or calculate) the transmitter power levels for each transmitter operating in the first cell. A filter (not shown), or filters depending on the embodiment described above, which may also be located in the first base station, generates a filtered transmitter power level based on all of the individual transmitter power levels acquired by the first base station. The filtered transmitter power level is then sent by the first base station, as indicated by connection 701, to a computer 702, located in MSC 703.

Next, the computer system 702 determines the new adaptive signal quality reference based on a preprogrammed function, relating filtered transmitter power and signal quality reference level, which has been stored in memory 704 of computer system 702. An example of such a function was illustrated in FIG. 3.

In an alternative embodiment, the computer system 702 may determine the new adaptive signal quality reference level based on more than one preprogrammed function, relating filtered transmitter power and the more than one signal quality measures as explained above (see FIG. 5). Then computer system 702 will combine the various signal quality measures, for the given filtered transmitter power level, to determine the new adaptive signal quality reference level.

Once the computer 702 determines the new adaptive signal quality reference level, based on the filtered transmitter power level and the one or more preprogrammed functions, the computer 702 sends the new adaptive signal quality reference level back to base station 1, as indicated by connection 705. Then, the transmitters associated with base station 1 and the mobile units in cell 1 can adjust their corresponding transmitter power levels appropriately so as to cause the actual signal quality measurements to substantially equal the newly determined signal quality reference level. As previously mentioned, the method implemented with the system components depicted in FIG. 7 is continuously or periodically repeated.

In each of the exemplary embodiments described above, a new adaptive signal quality reference level was determined for a given region of a cellular telecommunication system, where a region was defined as a cell, a group of cells, or all of the cells in the system. In other words, the transmitter power levels associated with each frequency (i.e., frequency channel) in the region would be adjusted in accordance with the same signal quality reference level. However, in another exemplary embodiment, a separate adaptive signal quality reference level could be maintained for each frequency in the region (i.e., a separate adaptive signal quality reference level for all channels operating at a given frequency) rather than maintaining one adaptive signal quality reference level for all of the frequencies in the region. In accordance with this exemplary embodiment, the transmitter power level associated with each frequency could be filtered over time using one filter (similar to FIG. 2A) or two filters (similar to FIG. 2B) per frequency. The filtered transmitter power level, or filtered transmitter power levels, can then be used to determine a new adaptive signal quality reference level, or more than one adaptive signal quality reference level (in accordance with the methods illustrated in FIGS. 2C and 2D), for each frequency. Once a new signal quality reference level, or signal quality reference levels, is determined for the given frequency, the transmitters associated with that frequency may be adjusted so that the actual signal quality for all of the channels operating over that frequency becomes substantially equal to the new signal quality reference level.

The invention has been described with reference to particularly described embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunication system, a method of controlling transmitter power level comprising the steps of:

determining a reference transmitter power level that is representative of an amount of power being transmitted in a region of the telecommunication system;

determining an adaptive signal quality reference level as a function of the reference transmitter power level; and adjusting transmitter power in the region of the telecommunication system so as to cause actual signal quality within the region of the telecommunication system to substantially equal the adaptive signal quality reference level.

2. The method of claim 1, wherein the step of determining the reference transmitter power level comprises the steps of:

acquiring values of transmitter power levels being utilized by transmitters within the region of the telecommunication system; and filtering the acquired values of transmitter power levels to generate the reference transmitter power level.

3. The method of claim 2, wherein said adaptive signal quality reference level is a function of a first reference measure of signal quality and a second reference measure of signal quality.

4. The method of claim 3, wherein said step of determining an adaptive signal quality reference level as a function of the reference transmitter power level comprises the steps of:

determining the first reference measure of signal quality as a function of the reference transmitter power level;

determining the second reference measure of signal quality as a function of the reference transmitter power level;

normalizing the first reference measure of signal quality;

weighting the first reference measure of signal quality;

normalizing the second reference measure of signal quality;

weighting the second reference measure of signal quality; and determining the adaptive signal quality reference level by combining the normalized and weighted first reference measure of signal quality and the normalized and weighted second reference measure of signal quality.

5. The method of claim 2, wherein said telecommunication system is a cellular telecommunication system and said at least one region comprises at least one cell.

6. The method of claim 1, wherein the step of determining an adaptive signal quality reference level comprises the step of:

determining an adaptive signal quality reference level only if said reference transmitter power level has changed by more than a predefined amount.

7. In a telecommunication system, a method of controlling transmitter power level comprising the steps of:

determining at least two reference transmitter power levels, each representative of an amount of power being transmitted in a region of the telecommunication system;

determining an adaptive signal quality reference level based on at least one of said at least two reference transmitter power levels; and adjusting transmitter power in the region of the telecommunication system so as to cause actual signal quality within the region of the telecommunication system to substantially equal the adaptive signal quality reference level.

8. The method of claim 7, wherein the step of determining at least two reference transmitter power levels comprises the steps of:

determining a first reference transmitter power level by using a first filter to filter acquired transmitter power values being utilized by transmitters belonging to a first group of transmitters; and determining a second reference transmitter power level by using a second filter to filter acquired transmitter power values being utilized by transmitters belonging to a second group of transmitters.

9. The method of claim 7, wherein the step of determining an adaptive signal quality reference level comprises the step of:

combining said at least two reference transmitter power levels.

10. In a telecommunication system, a method of controlling transmitter power levels comprising the steps of:

determining a first reference transmitter power level that is representative of a first amount of transmitter power being utilized by each transmitter from a first group of transmitters in a region of the telecommunication system;

determining a second reference transmitter power level that is representative of a second amount of transmitter power being utilized by each transmitter from a second group of transmitters in the region of the telecommunication system;

determining a first adaptive signal quality reference level as a function of said first reference transmitter power level;

determining a second adaptive signal quality reference level as a function of said second reference transmitter power level;

adjusting the amount of transmitter power being utilized by each transmitter from said first group of transmitters so as to cause actual signal quality associated with each transmitter from said first group of transmitters to substantially equal said first adaptive signal quality reference level; and adjusting the amount of transmitter power being utilized by each transmitter from said second group of transmitters so as to cause actual signal quality associated with each transmitter from said second group of transmitters to substantially equal said second adaptive signal quality reference level.

11. The method of claim 10, wherein each transmitter from said first group of transmitters is a mobile unit transmitter, and wherein each transmitter from said second group of transmitters is a base station transmitter.

12. In a telecommunication system, a method for controlling transmitter power level comprising the steps of:

determining a reference transmitter power level that is representative of an amount of transmitter power associated with a frequency channel in a telecommunication system;

determining an adaptive signal quality reference level for said frequency channel as a function of said reference transmitter power level; and adjusting the amount of transmitter power associated with said frequency channel as a function of said adaptive signal quality reference level.

13. The method of claim 12, wherein said step of adjusting the amount of transmitter power comprises the step:

adjusting the amount of transmitter power associated with said frequency channel as a function of said adaptive signal quality reference level and a measured signal quality level.

14. In a telecommunication system, an apparatus for controlling transmitter power level comprises:

means for determining a reference transmitter power level that is representative of an amount of power being transmitted in a region of the telecommunication system;

means for determining an adaptive signal quality reference level as a function of the reference transmitter power level; and means for adjusting transmitter power in the region of the telecommunication system so as to cause actual signal quality within the region of the telecommunication system to substantially equal the adaptive signal quality reference level.

15. The apparatus of claim 14, wherein said means for determining the reference transmitter power level comprises:

means for acquiring values of transmitter power levels being utilized by transmitters within the region of the telecommunication system; and means for filtering the acquired values of transmitter power to generate the reference transmitter power level.

16. The apparatus of claim 15, wherein said adaptive signal quality reference level is a function of a first reference measure of signal quality and a second reference measure of signal quality.

17. The apparatus of claim 16, wherein said means for determining an adaptive signal quality reference level as a function of the reference transmitter power level comprises:

means for determining the first reference measure of signal quality as a function of the reference transmitter power level;

means for determining the second reference measure of signal quality as a function of the reference transmitter power level;

means for normalizing the first reference measure of signal quality;

means for weighting the first reference measure of signal quality;

means for normalizing the second reference measure of signal quality;

means for weighting the second reference measure of signal quality; and means for determining the adaptive signal quality reference level by combining the weighted, first reference measure of signal quality and the weighted, second reference measure of signal quality.

18. The apparatus of claim 15, wherein said telecommunication system is a cellular telecommunication system and said at least one region comprises at least one cell.

19. The apparatus of claim 14, wherein said means for determining an adaptive signal quality reference level comprises:

means for determining an adaptive signal quality reference level only if said reference transmitter power level has changed by more than a predefined amount.

20. In a telecommunication system, an apparatus for controlling transmitter power level comprises:

means for determining at least two reference transmitter power levels, each representing an amount of power being transmitted in a region of the telecommunication system;

means for determining an adaptive signal quality reference level as a function of at least one of said at least two reference transmitter power levels; and means for adjusting transmitter power in the region of the telecommunication system so as to cause actual signal quality within the region of the telecommunication system to substantially equal the adaptive signal quality reference level.

21. The apparatus of claim 20, wherein said means for determining at least two reference transmitter power levels comprises:

means for using a second filter to filter acquired transmitter power values being utilized by transmitters belonging to a first group of transmitters to determine a first reference transmitter power level; and means for using a second filter to filter acquired transmitter power values being utilized by transmitters belonging to a first group of transmitters to determine a second reference transmitter power level.

22. The apparatus of claim 20, wherein said means for determining an adaptive signal quality reference level comprises:

means for determining an adaptive signal quality reference level by combining said at least two reference transmitter power levels.

23. In a telecommunication system, an apparatus for controlling transmitter power levels comprises:

means for determining a first reference transmitter power level that is representative of a first amount of transmitter power being utilized by each transmitter from a first group of transmitters in a region of the telecommunication system;

means for determining a second reference transmitter power level that is representative of a second amount of transmitter power being utilized by each transmitter from a second group of transmitters in the region of the telecommunication system;

means for determining a first adaptive signal quality reference level as a function of said first reference transmitter power level;

means for determining a second adaptive signal quality reference level as a function of said second reference transmitter power level;

means for adjusting the amount of transmitter power being utilized by each transmitter from said first group of transmitters so as to cause actual signal quality associated with each transmitter from said first group of transmitters to substantially equal said first adaptive signal quality reference level; and means for adjusting the amount of transmitter power being utilized by each transmitter from said second group of transmitters so as to cause actual signal quality associated with each transmitter from said second group of transmitters to substantially equal said second adaptive signal quality reference level.

24. The apparatus of claim 23, wherein each transmitter from said first group of transmitters is a mobile unit transmitter, and wherein each transmitter from said second group of transmitters is a base station transmitter.

25. In a telecommunication system, an apparatus for controlling transmitter power level comprises:

means for determining a reference transmitter power level that is representative of an amount of transmitter power associated with a frequency channel in a telecommunication system;

means for determining an adaptive signal quality reference level for said frequency channel as a function of said reference transmitter power level; and means for adjusting the amount of transmitter power associated with said frequency channel as a function of said adaptive signal quality reference level.

26. The apparatus of claim 25, wherein said means for adjusting the amount of transmitter power comprises:

means for adjusting the amount of transmitter power associated with said frequency channel as a function of said adaptive signal quality reference level and a measured signal quality level.

* * * * *